US012641164B2

(12) United States Patent
Varghese et al.

(10) Patent No.: US 12,641,164 B2
(45) Date of Patent: May 26, 2026

(54) REDUCING NETWORK TRAFFIC FOR ZERO-TOUCH COMPUTING NODE INITIALIZATION

(71) Applicant: Nutanix, Inc., San Jose, CA (US)

(72) Inventors: Toms Varghese, Bangaluru (IN);
Amritesh Patidar, Bangaluru (IN);
Kumar Sidhartha, Bengaluru (IN);
Monica Adusumilli, Bengaluru (IN)

(73) Assignee: Nutanix, Inc., San Jose, CA (US)

( * ) Notice: Subject to any disclaimer, the term of this patent is extended or adjusted under 35 U.S.C. 154(b) by 109 days.

(21) Appl. No.: 18/651,464

(22) Filed: Apr. 30, 2024

(65) Prior Publication Data

US 2025/0286935 A1     Sep. 11, 2025

(30) Foreign Application Priority Data

Mar. 9, 2024    (IN) .............................. 202441017027

(51) Int. Cl.
| | |
|---|---|
| *G06F 15/16* | (2006.01) |
| *H04L 67/1029* | (2022.01) |
| *H04L 67/563* | (2022.01) |

(52) U.S. Cl.
CPC ........ *H04L 67/563* (2022.05); *H04L 67/1029* (2013.01)

(58) Field of Classification Search
CPC .......................... H04L 67/563; H04L 67/1029
USPC .......................................................... 709/203
See application file for complete search history.

(56) References Cited

U.S. PATENT DOCUMENTS

| | | | | |
|---|---|---|---|---|
| 6,751,200 | B1 * | 6/2004 | Larsson | .................. H04L 45/26 |
| | | | | 370/255 |
| 6,813,272 | B1 * | 11/2004 | An | ......................... H04L 45/12 |
| | | | | 370/408 |
| 6,829,487 | B2 * | 12/2004 | Eiden | .................... H04L 12/185 |
| | | | | 455/519 |
| 7,072,846 | B1 * | 7/2006 | Robinson | ........... G06Q 30/0203 |
| | | | | 706/45 |
| 7,860,741 | B1 * | 12/2010 | Robinson | ............ G06F 16/9535 |
| | | | | 705/7.31 |
| 8,407,352 | B2 * | 3/2013 | Zhu | ..................... H04L 65/1104 |
| | | | | 709/228 |
| 8,549,518 | B1 | 10/2013 | Aron et al. | |
| 8,601,473 | B1 | 12/2013 | Aron et al. | |
| 8,850,130 | B1 | 9/2014 | Aron et al. | |
| 8,863,124 | B1 | 10/2014 | Aron | |
| 9,009,106 | B1 | 4/2015 | Aron et al. | |
| 9,069,708 | B2 | 6/2015 | Gill et al. | |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Alicia Baturay

(74) *Attorney, Agent, or Firm* — Foley & Lardner LLP

(57) ABSTRACT

A method may include transmitting, by a proxy node within a subnet, one or more messages to a cluster creation service to register a plurality of nodes within the subnet with the cluster creation service, receiving, at the proxy node, from the cluster creation service, a cluster creation request identifying a group of nodes of the plurality of nodes to form a cluster, and transmitting, by the proxy node, the cluster creation request to one or more of the group of nodes.

25 Claims, 4 Drawing Sheets

(56)  References Cited

U.S. PATENT DOCUMENTS

| | | | |
|---|---|---|---|
| 9,336,132 | B1 | 5/2016 | Aron et al. |
| 9,652,265 | B1 | 5/2017 | Narayanasamy et al. |
| 9,772,866 | B1 | 9/2017 | Aron et al. |
| 10,979,289 | B2 | 4/2021 | Sidhartha et al. |
| 11,159,367 | B2 | 10/2021 | Finn et al. |
| 12,074,758 | B2 * | 8/2024 | Bihannic ............. H04L 41/0895 |
| 2002/0044549 | A1 * | 4/2002 | Johansson ............. H04W 40/32 |
| | | | 370/386 |
| 2003/0149794 | A1 * | 8/2003 | Morris .................. H04W 92/02 |
| | | | 709/249 |

OTHER PUBLICATIONS

Poitras, Steven. "The Nutanix Bible" (Jan. 11, 2014), from http://
stevenpoitras.com/the-nutanix-bible/ (Publication date based on indi-
cated capture date by Archive.org; first publication date unknown).
Poitras, Steven. "The Nutanix Bible" (Oct. 15, 2013), from http://
stevenpoitras.com/the-nutanix-bible/ (Publication date based on indi-
cated capture date by Archive.org; first publication date unknown).
Poitras, Steven. "The Nutanix Bible" (Sep. 17, 2019), from https://
nutanixbible.com/.
Poitras, Steven. "The Nutanix Bible" (Jun. 20, 2014), from http://
stevenpoitras.com/the-nutanix-bible/ (Publication date based on indi-
cated capture date by Archive.org; first publication date unknown).
Poitras, Steven. "The Nutanix Bible" (Jan. 7, 2015), from http://
stevenpoitras.com/the-nutanix-bible/ (Publication date based on indi-
cated capture date by Archive.org; first publication date unknown).
Poitras, Steven. "The Nutanix Bible" (Jun. 9, 2015), from http://
stevenpoitras.com/the-nutanix-bible/ (Publication date based on indi-
cated capture date by Archive.org; first publication date unknown).
Sling, "Discovery API and its implementations", Jul. 17, 2018,
https://sling.apache.org/documentation/bundles/discovery-api-and-
impl.html.
Dell Technologies, "PowerScale: Isilon: Unconfigured nodes added
to an Isilon cluster may cause InfiniBand SM primary to change",
https://www.dell.com/support/kbdoc/en-in/000192527/isilon-
unconfigured-nodes-added-to-an-isilon-cluster-may-cause-infiniband-
sm-primary-to-change Sep. 20, 2022.
Elastic Docs, "Discovery and cluster information", https://www.
elastic.co/docs/deploy-manage/distributed-architecture/discovery-
cluster-formation 2025.
IBM, "Reliable Scalable Cluster Technology Version 3.2", https://
www.ibm.com/docs/en/SGVKBA_3.2/admin/admin.pdf. 2017, 2020.

\* cited by examiner

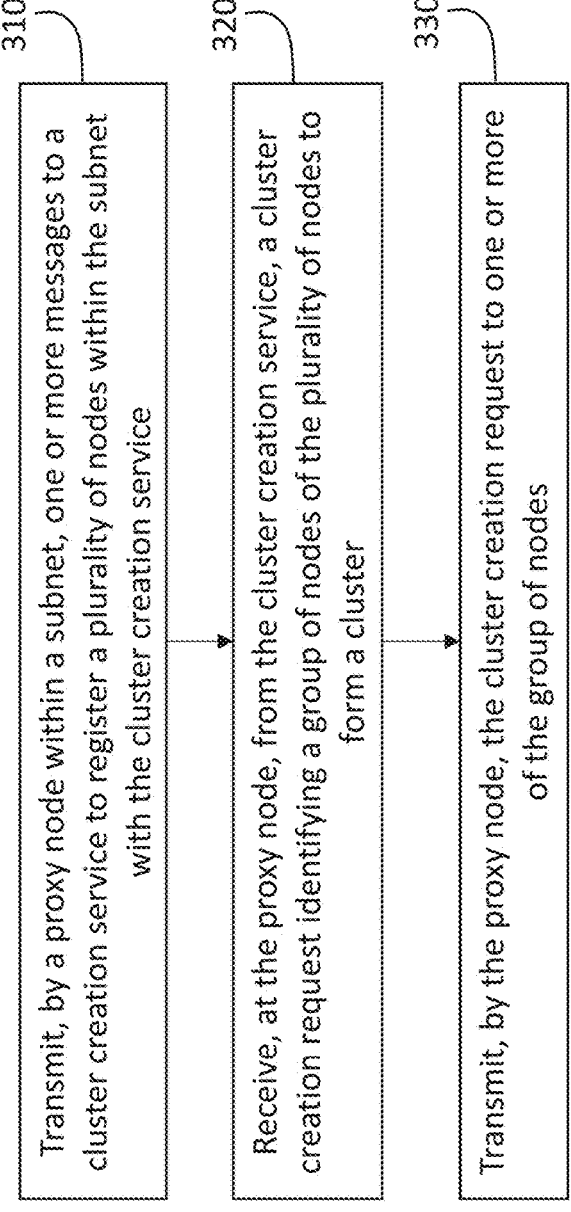

310

Transmit, by a proxy node within a subnet, one or more messages to a cluster creation service to register a plurality of nodes within the subnet with the cluster creation service

320

Receive, at the proxy node, from the cluster creation service, a cluster creation request identifying a group of nodes of the plurality of nodes to form a cluster

330

Transmit, by the proxy node, the cluster creation request to one or more of the group of nodes

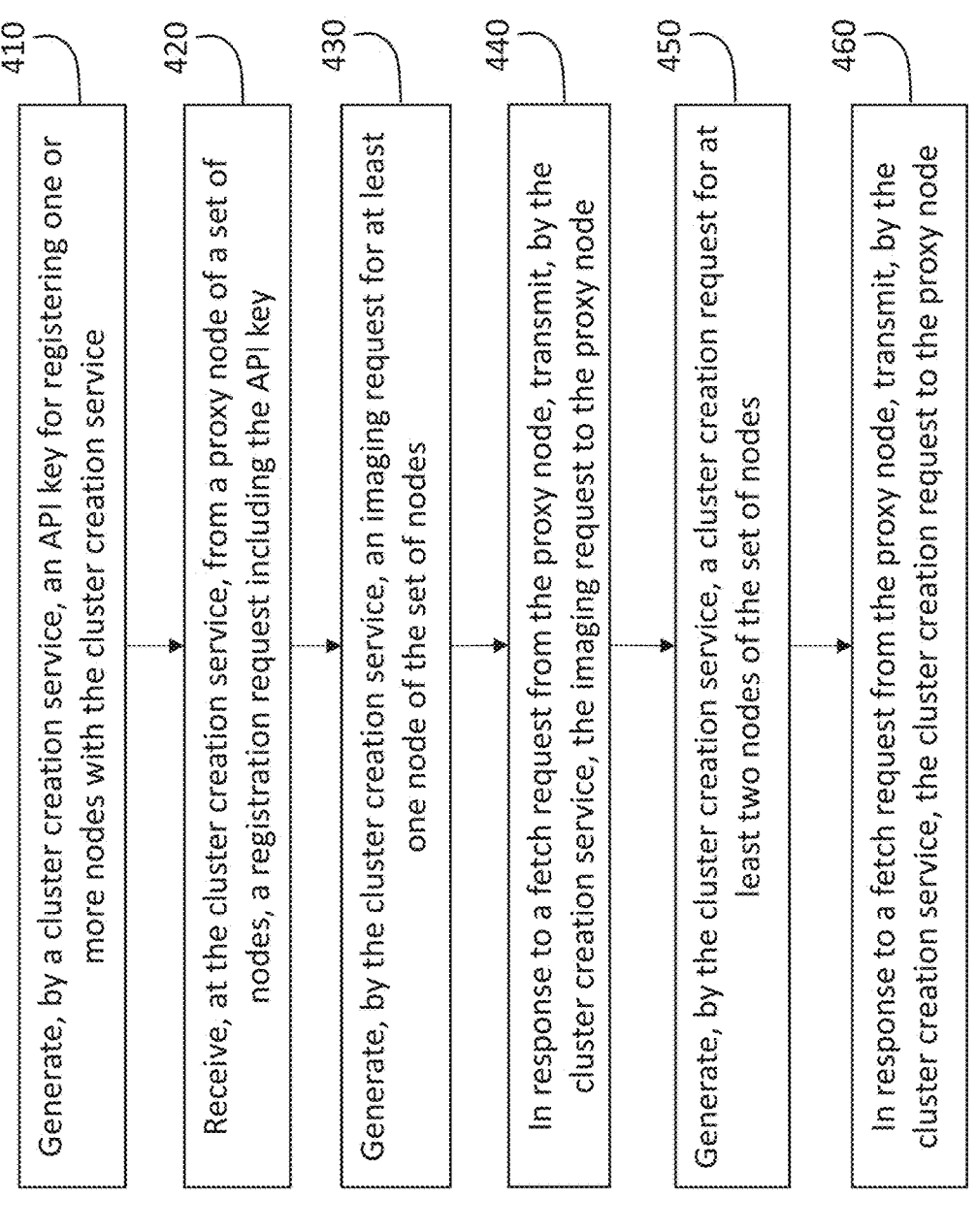

410 — Generate, by a cluster creation service, an API key for registering one or more nodes with the cluster creation service 420 — Receive, at the cluster creation service, from a proxy node of a set of nodes, a registration request including the API key 430 — Generate, by the cluster creation service, an imaging request for at least one node of the set of nodes 440 — In response to a fetch request from the proxy node, transmit, by the cluster creation service, the imaging request to the proxy node 450 — Generate, by the cluster creation service, a cluster creation request for at least two nodes of the set of nodes 460 — In response to a fetch request from the proxy node, transmit, by the cluster creation service, the cluster creation request to the proxy node

REDUCING NETWORK TRAFFIC FOR ZERO-TOUCH COMPUTING NODE INITIALIZATION

CROSS-REFERENCE TO RELATED APPLICATIONS

This application claims priority to Indian Provisional application No. 202441017027, filed Mar. 9, 2024 and titled "REDUCING NETWORK TRAFFIC FOR ZERO-TOUCH COMPUTING NODE INITIALIZATION," which application is incorporated herein by reference in its entirety.

BACKGROUND

A group of nodes may be used to form a cluster. A cluster formation service may manage nodes in data centers to form the nodes into clusters. A connection between each node and the cluster formation service may result in large amounts of network traffic between the data center and the cluster formation service, potentially overloading the cluster formation service.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

FIG. 3 is an example flow diagram of a method for a proxy node to communicate with a cluster creation service for a plurality of nodes, in accordance with some embodiments of the present disclosure.

FIG. 4 is an example flow diagram of a method for managing node imaging and cluster formation, in accordance with some embodiments of the present disclosure.

DETAILED DESCRIPTION

Figure 1:
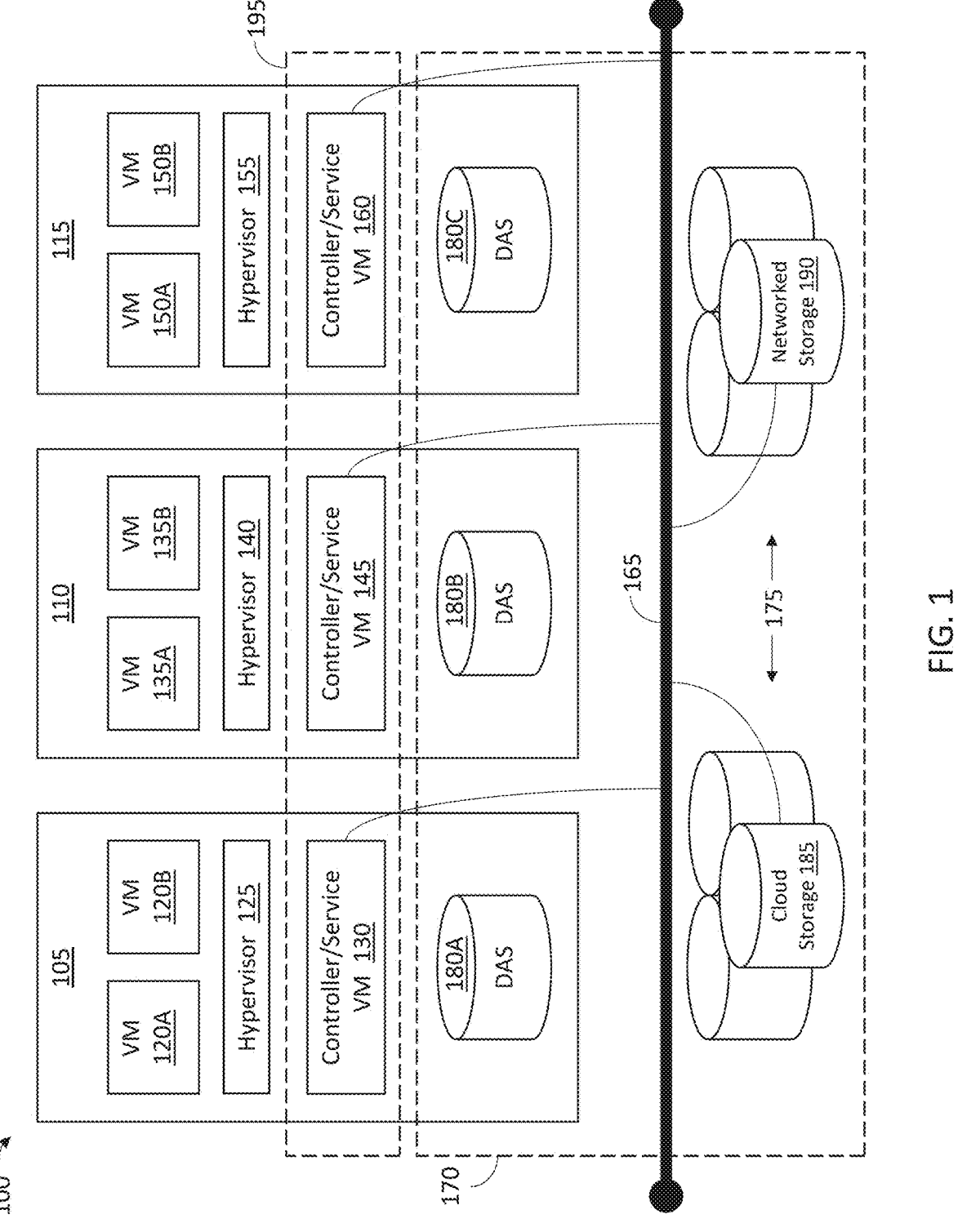
FIG. 1 illustrates an example cluster of a virtual computing system, in accordance with some embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Cluster formation may include forming a set of nodes into a cluster. Manually forming nodes into clusters may require travel to a data center and may introduce errors into the cluster formation process. A cluster creation service may automatically form clusters from nodes. Unconfigured nodes which are not formed into clusters may communicate with the cluster creation service to receive cluster creation requests. However, connections with all of the unconfigured nodes may overwhelm the cluster creation service. Embodiments discussed herein provide for automatic selection of proxy nodes for groupings of nodes which connect with the cluster creation service to reduce network traffic. By using proxy nodes, the number of connections between a data center and the cluster creation service is reduced dramatically. In an example, in a data center having ten subnets each containing one hundred nodes, the cluster creation service has one thousand connections with the data center using individual connections to the nodes, but only ten connections with the data center using connections to proxy nodes. By automatically selecting the proxy nodes, users do not have to manage network connections between the nodes of a data center and the cluster creation service. Newly installed nodes can automatically discover each other, automatically reach consensus in selecting a proxy node, and automatically connect, using the proxy node, to the cluster creation service. In this way, nodes in data centers are available to the cluster creation service on day zero, as soon as they are installed, without intervention from the user. This allows for fast, automatic ("zero-touch") initialization of nodes and formation of clusters while reducing network traffic between the data center and the cluster formation service.

In addition, use of proxy nodes provides for greater security for unconfigured nodes, as only the proxy node of a grouping of nodes needs to access a network, such as the internet, to connect with the cluster formation service. Reducing the number of network connections from the data center, and reducing the number of unconfigured nodes connected to the network, reduces a vulnerability of the unconfigured nodes.

FIG. 1 illustrates an example cluster 100 of a virtual computing system, in accordance with some embodiments of the present disclosure. The cluster 100 may be incorporated in a cloud based implementation, an on-premise implementation, or a combination of both. The cluster 100 may be part of a hyperconverged system or any other type of system. The cluster 100 includes a plurality of nodes, such as a first node 105, a second node 110, and a third node 115. Each of the first node 105, the second node 110, and the third node 115 may also be referred to as a "host" or "host machine." The first node 105 includes database virtual machines ("database VMs") 120A and 120B (collectively referred to herein as "database VMs 120"), a hypervisor 125 configured to create and run the database VMs, and a controller/service VM 130 configured to manage, route, and otherwise handle workflow requests between the various nodes of the cluster 100. Similarly, the second node 110 includes database VMs 135A and 135B (collectively referred to herein as "database VMs 135"), a hypervisor 140, and a controller/service VM 145, and the third node 115 includes database VMs 150A and 150B (collectively referred to herein as "database VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165. Further, although not shown, one or more of the first node 105, the second node 110, and the third node 115 may include one or more containers managed by a monitor (e.g., container system). In some embodiments, the controller/service VMs 130, 140, and 155 are not included in the cluster 100. The controller/service VMs 130, 145, and 160 may be in a first domain while the VMs 120, 135, and 150 are in a second domain. In an example, the controller/service VMs 130, 145, 160 are in a first cloud, the VMs 120 are in a second cloud, the VMs 130 are in a third cloud, and the VMs 150 are in a fourth cloud. In another example, the controller/service VMs 130, 140, 150 are in a first AWS account and the VMs 120, 135, and 150 are each in different, separate AWS accounts. Thus, the nodes 105, 110, and 115 may be nodes of various public or private clouds, with the controller/service VMs 130, 145, and 160 being separate from the VMs 120, 135, and 150. In an example, the controller/service VMs 130, 145, and 160 host a distributed control plane for managing the VMs 120, 135, and 150, where the VMs 120, 135, and 150 are database server VMs in public cloud accounts separate from a cloud account associated with the control plane.

The controller/service VMs 130, 145, and 160 can be considered a control plane and the VMs 120, 135, and 150 can be considered a data plane. The data plane may include data which is separate from the control logic executed on the control plane. VMs may be added to or removed from the data plane. AS discussed above, the control plane and the data plane may be in separate cloud accounts. Different VMs in the data plane may be in separate cloud accounts. In an example, the control plane is in a cloud account of a database management platform provider and the data plane is in cloud accounts of customers of the database management platform provider.

The cluster 100 also includes and/or is associated with a storage pool 170 (also referred to herein as storage subsystem). The storage pool 170 may include network-attached storage 175 and direct-attached storage 180A, 180B, and 180C. The network-attached storage 175 is accessible via the network 165 and, in some embodiments, may include cloud storage 185, as well as a networked storage 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be provided within the cluster. Likewise, although only two database VMs (e.g., the database VMs 120, the database VMs 135, the database VMs 150) are shown on each of the first node 105, the second node 110, and the third node 115, in other embodiments, the number of the database VMs on each of the first, second, and third nodes may vary to include other numbers of database VMs. Further, the first node 105, the second node 110, and the third node 115 may have the same number of database VMs (e.g., the database VMs 120, the database VMs 135, the database VMs 150) or different number of database VMs.

In some embodiments, each of the first node 105, the second node 110, and the third node 115 may include a hardware device, such as a server. For example, in some embodiments, one or more of the first node 105, the second node 110, and the third node 115 may include a server computer provided by Nutanix, Inc., Dell, Inc., Lenovo Group Ltd. or Lenovo PC International, Cisco Systems, Inc., etc. In other embodiments, one or more of the first node 105, the second node 110, or the third node 115 may include another type of hardware device, such as a personal computer, an input/output or peripheral unit such as a printer, or any type of device that is suitable for use in a node within the cluster 100. In some embodiments, the cluster 100 may be part of one or more data centers. Further, one or more of the first node 105, the second node 110, and the third node 115 may be organized in a variety of network topologies. Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. In some embodiments, the processing units may execute instructions without first copying the instructions to the RAM. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices that are suitable for a virtual computing system. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the networked storage 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the database VMs 120, the database VMs 135, and the database VMs 150.

Each of the database VMs 120, the database VMs 135, the database VMs 150 is a software-based implementation of a computing machine. The database VMs 120, the database VMs 135, the database VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the database VMs 120, the database VMs 135, the database VMs 150 that may run its own operating system and applications on the underlying physical resources just like a real computer. By encapsulating an entire machine, including CPU, memory, operating system, storage devices, and network devices, the database VMs 120, the database VMs 135, the database VMs 150 are compatible with most standard operating systems (e.g. Windows, Linux, etc.), applications, and device drivers.

Thus, each of the hypervisor 125, the hypervisor 140, and the hypervisor 155 is a virtual machine monitor that allows a single physical server computer (e.g., the first node 105, the second node 110, third node 115) to run multiple instances of the database VMs 120, the database VMs 135, and the database VMs 150 with each VM sharing the resources of that one physical server computer, potentially across multiple environments. For example, each of the hypervisor 125, the hypervisor 140, and the hypervisor 155 may allocate memory and other resources to the underlying VMs (e.g., the database VMs 120, the database VMs 135, the database VM 150A, and the database VM 150B) from the storage pool 170 to perform one or more functions.

By running the database VMs 120, the database VMs 135, and the database VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new database VMs are created (e.g., installed) on the first node 105, the second node 110, and the third node 115, each of the new database VMs may be configured to be associated with certain hardware resources, software resources, storage resources, and other resources within the cluster 100 to allow those virtual VMs to operate as intended.

The database VMs 120, the database VMs 135, the database VMs 150, and any newly created instances of the database VMs may be controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may be considered a local management system configured to manage various tasks and operations within the cluster 100. For example, in some embodiments, the local management system may perform various management related tasks on the database VMs 120, the database VMs 135, and the database VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the database VMs 120, the database VMs 135, the database VM 150A, and the database VM 150B, respectively, and for managing the interactions between those VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications. The network 165 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 105, the second node 110, or the third node 115 may be configured as a leader node. The leader node may be configured to monitor and handle requests from other nodes in the cluster 100. For example, a particular database VM (e.g., the database VMs 120, the database VMs 135, or the database VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 100 to fulfil that request). Upon fulfilling the input/output request, the controller/service VM of the leader node may send a response back to the controller/service VM of the node from which the request was received, which in turn may pass the response to the database VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein. For example, in some embodiments, the VMs 120, 135, and 150 are not in the same nodes as the controller/service VMs 130, 145 155. The VMs 120, 135, and 150 may be located in a different cloud than the controller/service VMs 130, 145 155.

Figure 2:
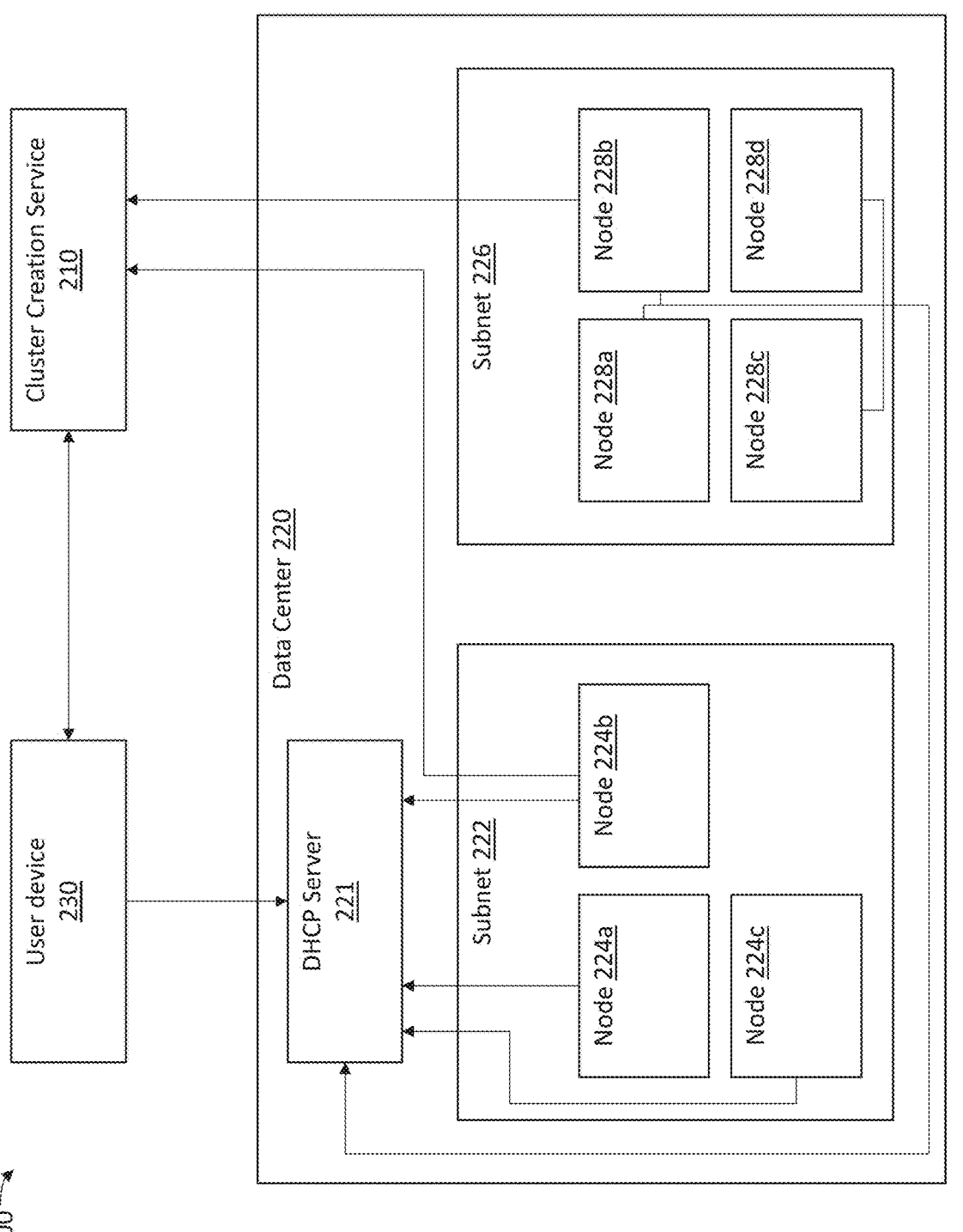
FIG. 2 illustrates an example system including a cluster creation service, in accordance with some embodiments of the present disclosure.

FIG. 2 illustrates an example system 200 including a cluster creation service 210, in accordance with some embodiments of the present disclosure. The system 200 may include the cluster creation service, a data center 220, and a user device 230. The cluster creation service 210 may manage, based on input from the user device 230, resources (e.g., nodes) of the data center 220 associated with the user device 230. The cluster creation service 210 may be a service executed on a computing device, such as a server. The cluster creation service 210 may manage data center resources, such as nodes, in a plurality of data centers based on input from a plurality of user devices 230. The cluster creation service 210 may manage nodes in on-premises systems. The cluster creation service 210 may be highly scalable in order to manage data center resources across multiple different data centers and on-premise systems. In some implementations, the cluster creation service 210 may be executed on a cluster of nodes such as the cluster 100 of FIG. 1.

The data center 220 may include a first subnet 222 and a second subnet 226. The first subnet 222 may include a first node 224a, a second node 224b, and a third node 224c, referred to herein collectively as "first subnet nodes 224." The first subnet 222, while illustrated as including three nodes, may include any number of nodes. The second subnet 226 may include a fourth node 228a, a fifth node 228b, a sixth node 228c, and a seventh node 228d, referred to herein collectively as "second subnet nodes 228." Each of the first subnet 222 and the second subnet 226 may be a segmented piece of a larger network, such as a datacenter network. The first subnet 222 and the second subnet 226 may be logical partitions of an IP network of the datacenter. Although the data center 220 is illustrated as including two subnets, the data center 220 may include any number of subnets.

The data center 220 may include a dynamic host configuration protocol (DHCP) server 221. The DHCP server 221 may automatically provide and assign IP addresses and other network parameters to the first subnet nodes 224 and the second subnet nodes 228. The DHCP server 221 may assign IP addresses to the first subnet nodes 224 and the second subnet nodes 228 according to their respective subnets. Each of the first subnet nodes 224 and the second subnet nodes 228 may connect to the DHCP server 221.

The first subnet 222 may include a proxy node which communicates with the cluster creation service 210 on behalf of the first subnet nodes 224. The proxy node may be any node of the first subnet nodes 224. In an example, the second node 224b is the proxy node and communicates with the cluster creation service 210 on behalf of the first subnet nodes 224. The proxy node for the first subnet 222 may function as a proxy for the first subnet nodes 224, fetching and/or receiving requests (e.g., node imaging requests, cluster creation requests) from the cluster creation service 210.

The proxy node of the first subnet 222 may be automatically selected by first subnet nodes 224. The first subnet nodes 224 may reach a consensus among themselves to select the proxy node. The first subnet nodes 224 may, upon installation in the data center 220, discover each other within the first subnet 222 and reach consensus to select the proxy node. Once the proxy node for the first subnet 222 is automatically selected by the first subnet nodes 224, the proxy node may connect to the cluster creation service 210. The proxy node for the first subnet 222 may register the first subnet nodes 224 with the cluster creation service 210. Registering the first subnet nodes 224 may include transmitting identifiers of the first subnet nodes 224 to the cluster creation service 210. The proxy node for the first subnet 222 may send a consolidated heartbeat for the first subnet nodes 224 to the cluster creation service 210. The consolidated heartbeat may indicate that the first subnet nodes 224 are operational. The proxy node for the first subnet 222 may send the consolidated heartbeat periodically to inform the cluster creation service 210 of the status of the first subnet nodes 224. In this way, the proxy node reduces the number of nodes that connect with the cluster creation service 210, reducing network traffic from the data center 220 to the cluster creation service 210. In an example, in a data center having ten subnets each containing one hundred nodes, the cluster creation service 210 has one thousand connections with the data center using individual connections to the nodes, but only ten connections with the data center using connections to proxy nodes. In an example, the cluster creation service 210 has one million connections with nodes across multiple data centers and on-premises systems using individual connections to the nodes, but only eight thousand and sixty-five connections using connections to proxy nodes.

Registering, by the proxy node, the first subnet nodes 224 may include transmitting an API key associated with the user to the cluster creation service 210. The user device 230 may generate an API key from the cluster creation service 210. The user device 230 may transmit the API key and an address of the cluster creation service 210 to the DHCP server 221. The address of the cluster creation service 210 may be an IP address, a hostname, or a URL. The first subnet nodes 224 may retrieve the API key and address of the cluster creation service 210 from the DHCP server 221. The proxy node of the first subnet 222 may use the API key and address of the cluster creation service 210 to authenticate the first subnet nodes 224 with the cluster creation service 210 and register the first subnet nodes 224 with the cluster creation service 210.

The proxy node of the first subnet 222 may fetch requests from the cluster creation service 210. The cluster creation service 210 may generate requests based on input from the user device 230. In an example, the cluster creation service 210 generates node image requests based on user input at the user device 230 and/or a service-level-agreement (SLA) associated with the user. In an example, the cluster creation service 210 generates a cluster formation request based on user input at the user device 230, an SLA associated with the user, and/or increased demand from the user device 230 for services running on clusters requiring additional clusters. The proxy node of the first subnet 222 may transmit the fetched requests to the first subnet nodes 224 or the nodes of the first subnet nodes 224 identified in the request. In an example, the proxy node of the first subnet 222 fetches a cluster creation request identifying the first node 224*a* and the third node 224*c* to form a cluster and transmits the cluster creation request to the first node 224*a* and the third node 224*c* to cause the first node 224*a* and the third node 224*c* to form a cluster.

The first subnet nodes 224 may select a new proxy node if the proxy node becomes unavailable. In an example, the proxy node may become unavailable due to failure of the proxy node, due to the proxy node being formed into a cluster, or otherwise becoming unavailable to the other first subnet nodes 224. The first subnet nodes 224 which are not formed into clusters, otherwise referred to as "unconfigured nodes," may reach consensus and select a new proxy node. In some implementations, the cluster creation service 210 may indicate to the first subnet nodes 224 that the original proxy node is connected to the cluster creation service 210, causing the first subnet nodes 224 to attempt to connect to the original proxy node. In this way, the cluster creation service 210 can mitigate redundancies in network connections with the first subnet nodes 224.

In an example, a newly installed node may attempt to discover other nodes in its subnet. If the newly installed node does not discover other nodes in its subnet, the newly installed node connects with the cluster creation service 210. The cluster creation service 210 indicates to the newly installed node that a proxy node exists in the subnet, causing the newly installed node to attempt to connect with the proxy node.

While functions are discussed herein as being performed by the first subnet nodes 224 and the proxy node of the first subnet 222, these functions may be performed by a service or agent running on the first subnet nodes 224 and/or the proxy node of the first subnet 222. In some implementations, when the first subnet nodes 224 are installed, an agent of the cluster creation service 210 starts running on each of the first subnet nodes 224. The agent running on each node may discover the other nodes in the first subnet 222 and reach consensus with the other agents in selecting the proxy node. The agent running on the proxy node may connect with the cluster creation service 210 to register the first subnet nodes 224 and fetch requests from the cluster creation service 210. The agent may run on a controller VM (CVM) of each of the first subnet nodes 224. The agent may run on any software of the first subnet nodes 224. Any node of the first subnet nodes 224 running the agent can perform the actions of discovering the other nodes, selecting the proxy node, and functioning as the proxy node, among other actions.

The second subnet 226 may include a proxy node which communicates with the cluster creation service 210 on behalf of the second subnet nodes 228. The proxy node may be any node of the second subnet nodes 228. In an example, the fifth node 228*b* is the proxy node and communicates with the cluster creation service 210 on behalf of the second subnet nodes 228. The proxy node for the second subnet 226 may function as a proxy for the second subnet nodes 228, fetching and/or receiving requests from the cluster creation service 210. The second subnet 226 may function similar to the first subnet 222 in selecting the proxy node for the second subnet 226. The proxy node for the second subnet 226 may function similar to the proxy node for the first subnet 222 in fetching requests form the cluster creation service 210. The second subnet nodes 228 may, similar to the first subnet nodes 224, run agents of the cluster creation service 210 for performing one or more functions discussed herein. The second subnet nodes 228 may retrieve the API key from the DHCP server 221 and the proxy node for the second subnet 226 may use the API key to register the second subnet nodes 228 with the cluster creation service 210.

While the first subnet 222 and the second subnet 226 are discussed as having one proxy node each, each of the first subnet 222 and the second subnet 226 may have more than one proxy node. In some implementations, an additional proxy node may be selected based on the proxy node functioning as proxy for a threshold number of nodes. In an example, if the proxy node functions as proxy for one hundred and twenty four nodes, an additional proxy node is selected to avoid routing too much traffic through the proxy node.

While proxy nodes have been discussed as being selected within subnets, such as the first subnet 222 and the second subnet 226, other groupings of nodes are considered. In some implementations, other co-located groupings of nodes automatically select proxy nodes for connecting with the cluster creation service 210. In an example, a grouping of nodes in a rack in a datacenter automatically selects a proxy node for connecting with the cluster creation service 210.

While the cluster creation service 210 is illustrated as connected to two proxy nodes in a data center, the cluster creation service 210 may be connected to a plurality of proxy nodes in multiple data centers and on-premises systems. In this way, the cluster creation service 210 may provide cluster imaging and creation services to a large number of nodes across various different systems.

FIG. 3 is an example flow diagram of a method 300 for a proxy node to communicate with a cluster creation service for a plurality of nodes, in accordance with some embodiments of the present disclosure. The method 300 may include more, fewer, or different operations than shown. The operations may be performed in the order shown, a different order, or concurrently. The method 300 may be performed by components of the system 200 of FIG. 2, such as the proxy node 124*b* or the proxy node 128*b* of FIG. 2.

At operation 310, a proxy node within a subnet transmits one or more messages to a cluster creation service to register a plurality of nodes within the subnet with the cluster creation service. The proxy node may transmit the one or more messages on behalf of the plurality of nodes to reduce network traffic to the cluster creation service. The proxy node may aggregate registration requests from the plurality of nodes to register the plurality of nodes with the cluster creation service. The proxy node may generate a batch registration request for the plurality of nodes.

Registering the plurality of nodes with the cluster creation service may include using an API key provided by a user. The user may generate the API key at the cluster creation service and provide the API key to the proxy node. The proxy node may use the API key to authenticate the plurality of nodes to the cluster creation service. The API key may identify the plurality of nodes as associated with the user.

The proxy node may transmit a consolidated heartbeat for the plurality of nodes to the cluster creation service. The consolidated heartbeat may indicate a status of the plurality of nodes (e.g., that the plurality of nodes are powered on and operational). The cluster creation service may provide the status of the plurality of nodes to a user to indicate that the plurality of nodes are available for cluster formation.

Transmitting the one or more messages to the cluster creation service includes transmitting the one or more messages using an agent of the cluster creation service executed on the proxy node. The agent of the cluster creation service may be pre-installed on the proxy node such that when the proxy node is installed in a data center, the agent automatically connects with the cluster creation service. The agent of the cluster creation service running on the proxy node may connect with the cluster creation service based on the proxy node being the proxy node. Similar agents running on other nodes of the plurality of nodes may communicate only with the proxy node in order to reduce network traffic.

In some implementations, each node of the plurality of nodes includes an agent of the cluster creation service. The agent of the cluster creation service may be the same on each of the plurality of nodes. The agent of the cluster creation service may communicate with the proxy node or the cluster creation service based on whether the host node is the proxy node. In this way, any node of the plurality of nodes may function as the proxy node.

In some implementations, the method 300 includes automatically selecting, by the plurality of nodes, the proxy node from the plurality of nodes. In some implementations, the method 300 may include discovering, by the proxy node, the plurality of nodes within the subnet. The plurality of nodes, or the agent of the cluster creation service running on each of the plurality of nodes, may discover the plurality of nodes within the subnet and reach a consensus to select the proxy node. In this way, the plurality of nodes automatically select the proxy node without user input. In an example, a group of nodes is pre-loaded with the agent of the cluster creation service such that when the group of nodes is installed in a subnet, the group of nodes automatically selects a proxy node which connects with the cluster creation service to register the group of nodes with the cluster creation service. This automatic discovery and registration process allows for user-free, "zero-touch" initialization of the nodes for use in clusters.

In some implementations, the method 300 includes automatically selecting, by the plurality of nodes, in response to the proxy node being unavailable, a new proxy node from the plurality of nodes. The proxy node may be unavailable due to a failure of the node, a network failure, or the proxy node forming a cluster with other nodes. The selection of a new proxy node may be the same as the selection of the original proxy node. The plurality of nodes, or the remaining plurality of nodes, may automatically reach consensus to select the new proxy node. As discussed herein, any of the remaining plurality of nodes may be the new proxy node. The new proxy node may communicate with the cluster creation service on behalf of the remaining plurality of nodes.

The proxy node may forward requests from the plurality of nodes to the cluster creation service. The proxy node may forward responses from the cluster creation service to the plurality of nodes. In this way, each node of the plurality of nodes may communicate only with the proxy node while only the proxy node communicates with the cluster creation service, reducing network traffic.

At operation 320, the proxy node receives, from the cluster creation service, a cluster creation request identifying a group of nodes of the plurality of nodes to form a cluster. The cluster creation request may include identifiers of the group of nodes. In some implementations, the cluster creation request includes an indication of a leader node for the cluster. The leader node for the cluster may communicate with the cluster formation service once the cluster is formed to confirm that the cluster is successfully formed. In an example, the leader node for the cluster, once the cluster is formed, transmits a cluster status of the cluster to the cluster creation service.

The proxy node may receive the cluster creation request in response to the proxy node fetching or pulling the cluster creation request from the cluster creation service. The proxy node may periodically query the cluster creation service for tasks, such as the cluster creation request. In this way, the cluster creation service does not have to query a plurality of proxy nodes or send requests to the plurality of proxy nodes. In an example, the cluster creation service is queried by ten thousand proxy nodes for tasks. In this example, if proxy nodes were not used, the cluster creation service would be queried by one hundred thousand nodes, potentially overloading the cluster creation service and resulting in large amounts of traffic from data centers housing the nodes.

In some implementations, the proxy node may be part of the group of nodes to form the cluster. In some implementations, the proxy node is not part of the group of nodes to form the cluster. In an example, the proxy node pulls the cluster creation request for four nodes of the subnet (not including the proxy node) to form a cluster. In an example, the proxy node pulls the cluster creation request for four nodes of the subnet, including the proxy node, to form a cluster. In this way, the nodes available for cluster formation are not restricted by the identity of the proxy node.

At operation 330, the proxy node transmits the cluster creation request to one or more of the group of nodes. In some implementations, the proxy node transmits the cluster creation request to each of the nodes in the group of nodes. In some implementations, the proxy node transmits the cluster creation request to one node of the group of nodes (e.g., the leader node identified in the cluster creation request) which transmits the cluster creation request to the remainder of the group of nodes. Once the cluster is formed, the cluster may communicate directly with the cluster formation service such that the proxy node functions as a proxy for the remaining unconfigured (i.e., not formed into a cluster) nodes in the subnet.

FIG. 4 is an example flow diagram of a method 400 for managing node imaging and cluster formation, in accordance with some embodiments of the present disclosure. The method 400 may include more, fewer, or different operations than shown. The operations may be performed in the order shown, a different order, or concurrently. The method 400 may be performed by components of the system 200 of FIG. 2, such as the cluster creation service 210 of FIG. 2.

At operation 410, the cluster creation service generates an API key for registering one or more nodes with the cluster creation service. The cluster creation service may generate the API key based on user input. In an example, a user device generates the API key at the cluster creation service in order to register the one or more nodes in a data center.

At operation 420, the cluster creation service receives, from a proxy node of a set of nodes, a registration request including the API key. The cluster creation service may receive a consolidated heartbeat from the proxy node indicating a status of the set of nodes. The registration request and/or the consolidated heartbeat may indicate to the cluster creation service an identity of the set of nodes for which the proxy node functions as proxy.

At operation 430, the cluster creation service generates an imaging request for at least one node of the set of nodes. At operation 440, in response to a fetch request from the proxy node, the cluster creation service transmits the imaging request to the proxy node. The proxy node may route the imaging request to the at least one node of the set of nodes and return a result (i.e., image) to the cluster creation request.

At operation 450, the cluster creation service generates a cluster creation request for at least one node of the set of nodes. At operation 460, in response to a fetch request from the proxy node, the cluster creation service transmits the cluster creation request to the proxy node. The proxy node may route the imaging request to at least one node of the set of nodes. In some implementations, the proxy node returns an indication to the cluster creation service that the cluster creation request was delivered to the at least one node. Once the cluster is formed, the cluster may communicate a cluster status of the cluster to the cluster formation service. The cluster creation service may receive the cluster status from the cluster formed from the at least one node. In some implementations, the cluster communicates the status of the cluster to the cluster formation service via the proxy node. In an example, the cluster, upon being formed, communicates the status of the cluster to the cluster formation service via the proxy node and then ceases to use the proxy node for communication with the cluster formation service.

The method 400 may include other requests for the set of nodes. Imaging requests (i.e. requests to reinstall same or different software versions) and cluster formation requests (i.e., requests to form nodes into a cluster) have been discussed, and the cluster formation service can request the set of nodes to perform any action which the set of nodes are capable of performing. In an example, the cluster formation service monitors a status of the set of nodes for a period of time, such as via the consolidated heartbeat, and generates multiple imaging requests for the set of nodes and other requests before generating a cluster formation request.

Aspects of the present disclosure are directed to a method including transmitting, by a proxy node within a subnet, one or more messages to a cluster creation service to register a plurality of nodes within the subnet with the cluster creation service, receiving, at the proxy node, from the cluster creation service, a cluster creation request identifying a group of nodes of the plurality of nodes to form a cluster, and transmitting, by the proxy node, the cluster creation request to one or more of the group of nodes.

In some implementations, the method includes automatically selecting, by the plurality of nodes, the proxy node from the plurality of nodes. In some implementations, the method includes automatically selecting, by the plurality of nodes, in response to the proxy node being unavailable, a new proxy node from the plurality of nodes. In some implementations, transmitting the one or more messages to the cluster creation service includes transmitting the one or more messages using an agent of the cluster creation service executed on the proxy node. In some implementations, the cluster creation request includes an indication of a leader node for the cluster. In some implementations, each node of the plurality of nodes includes an agent of the cluster creation service. In some implementations, the method includes discovering, by the proxy node, the plurality of nodes within the subnet.

Aspects of the present disclosure are directed to an apparatus including one or more processors and non-transitory, computer-readable media including instructions which, when executed by the one or more processors, cause the one or more processors to transmit one or more messages to a cluster creation service to register a plurality of nodes within a subnet with the cluster creation service, receive, from the cluster creation service, a cluster creation request identifying a group of nodes of the plurality of nodes to form a cluster, and transmit the cluster creation request to one or more of the group of nodes.

In some implementations, the instructions further cause the one or more processors to perform a proxy selection process with the plurality of nodes to select a proxy node from the plurality of nodes, and wherein the proxy node includes the one or more processors. In some implementations, the instructions further cause the one or more processors to perform a proxy selection process with the plurality of nodes to select a proxy node from the plurality of nodes in response to a previous proxy node being unavailable. In some implementations, the instructions further cause the one or more processors to transmit the one or more messages to the cluster creation service using an agent of the cluster creation service executed by the one or more processors. In some implementations, each node of the plurality of nodes includes an agent of the cluster creation service. In some implementations, the instructions further cause the one or more processors to discover the plurality of nodes within the subnet.

Aspects of the present disclosure are directed to a system including a plurality of nodes within a subnet, the plurality of nodes including a proxy node which executes non-transitory, computer-readable instructions to transmit one or more messages to a cluster creation service to register a plurality of nodes within a subnet with the cluster creation service, receive, from the cluster creation service, a cluster creation request identifying a group of nodes of the plurality of nodes to form a cluster, and transmit the cluster creation request to one or more of the group of nodes.

In some implementations, the plurality of nodes execute non-transitory, computer-readable instructions to automatically select the proxy node from the plurality of nodes. In some implementations, the plurality of nodes execute non-transitory, computer-readable instructions to select, in response to the proxy node being unavailable, a new proxy node from the plurality of nodes. In some implementations, the proxy node executes non-transitory, computer-readable instructions to transmit the one or more messages using an agent of the cluster creation service executed on the proxy node. In some implementations, the cluster creation request includes an indication of a leader node for the cluster. In some implementations, each node of the plurality of nodes includes an agent of the cluster creation service. In some implementations, the proxy node executes non-transitory, computer-readable instructions to discover the plurality of nodes within the subnet.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a model stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the monitoring device 102) to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:
transmitting, by a proxy node within a subnet, one or more messages to a centralized cluster creation service external to a data center containing the subnet to register a plurality of nodes within the subnet with the cluster creation service;
receiving, at the proxy node, from the cluster creation service, a cluster creation request identifying a group of nodes of the plurality of nodes to form a cluster; and
transmitting, by the proxy node, the cluster creation request to one or more of the group of nodes.

2. The method of claim 1, further comprising automatically selecting, by the plurality of nodes, the proxy node from the plurality of nodes.

3. The method of claim 1, further comprising automatically selecting, by the plurality of nodes, in response to the proxy node being unavailable, a new proxy node from the plurality of nodes.

4. The method of claim 1, wherein transmitting the one or more messages to the cluster creation service comprises transmitting the one or more messages using an agent of the cluster creation service executed on the proxy node.

5. The method of claim 1, wherein the cluster creation request includes an indication of a leader node for the cluster.

6. The method of claim 1, wherein each node of the plurality of nodes includes an agent of the cluster creation service.

7. The method of claim 1, further comprising discovering, by the proxy node, the plurality of nodes within the subnet.

8. The method of claim 1, further comprising transmitting, by the proxy node, a consolidated heartbeat for the plurality of nodes to the cluster creation service.

9. The method of claim 8, wherein the consolidated heartbeat indicates a status of the plurality of nodes.

10. The method of claim 9, wherein the status indicates that the plurality of nodes are powered on and operational.

11. The method of claim 8, wherein transmitting the consolidated heartbeat comprises transmitting the consolidated heartbeat periodically to inform the cluster creation service of the status of the plurality of nodes.

12. The method of claim 8, wherein the consolidated heartbeat reduces network traffic from a data center containing the subnet to the cluster creation service by providing status information for the plurality of nodes through a single connection via the proxy node.

13. An apparatus comprising one or more processors and non-transitory, computer-readable media comprising instructions which, when executed by the one or more processors, cause the one or more processors to:

transmit one or more messages to a centralized cluster creation service external to a data center containing the subnet to register a plurality of nodes within a subnet with the cluster creation service;

receive, from the cluster creation service, a cluster creation request identifying a group of nodes of the plurality of nodes to form a cluster; and transmit the cluster creation request to one or more of the group of nodes.

14. The apparatus of claim 13, wherein the instructions further cause the one or more processors to perform a proxy selection process with the plurality of nodes to select a proxy node from the plurality of nodes, and wherein the proxy node comprises the one or more processors.

15. The apparatus of claim 13, wherein the instructions further cause the one or more processors to perform a proxy selection process with the plurality of nodes to select a proxy node from the plurality of nodes in response to a previous proxy node being unavailable.

16. The apparatus of claim 13, wherein the instructions further cause the one or more processors to transmit the one or more messages to the cluster creation service using an agent of the cluster creation service executed by the one or more processors.

17. The apparatus of claim 13, wherein each node of the plurality of nodes includes an agent of the cluster creation service.

18. The apparatus of claim 13, wherein the instructions further cause the one or more processors to discover the plurality of nodes within the subnet.

19. A system comprising a plurality of nodes within a subnet, the plurality of nodes including a proxy node which executes non-transitory, computer-readable instructions to:

transmit one or more messages to a centralized cluster creation service external to a data center containing the subnet to register a plurality of nodes within a subnet with the cluster creation service;

receive, from the cluster creation service, a cluster creation request identifying a group of nodes of the plurality of nodes to form a cluster; and transmit the cluster creation request to one or more of the group of nodes.

20. The system of claim 19, wherein the plurality of nodes execute non-transitory, computer-readable instructions to automatically select the proxy node from the plurality of nodes.

21. The system of claim 19, wherein the plurality of nodes execute non-transitory, computer-readable instructions to select, in response to the proxy node being unavailable, a new proxy node from the plurality of nodes.

22. The system of claim 19, wherein the proxy node executes non-transitory, computer-readable instructions to transmit the one or more messages using an agent of the cluster creation service executed on the proxy node.

23. The system of claim 19, wherein the cluster creation request includes an indication of a leader node for the cluster.

24. The system of claim 19, wherein each node of the plurality of nodes includes an agent of the cluster creation service.

25. The system of claim 19, wherein the proxy node executes non-transitory, computer-readable instructions to discover the plurality of nodes within the subnet.

\* \* \* \* \*